US010719731B2

(12) United States Patent
Song et al.

(10) Patent No.: US 10,719,731 B2
(45) Date of Patent: *Jul. 21, 2020

(54) ROBUST FEATURE IDENTIFICATION FOR IMAGE-BASED OBJECT RECOGNITION

(71) Applicant: Nant Holdings IP, LLC, Culver City, CA (US)

(72) Inventors: Bing Song, La Canada, CA (US); Liwen Lin, Los Angeles, CA (US); Mustafa Jaber, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,876

(22) Filed: Jun. 24, 2019

(65) Prior Publication Data

US 2019/0318195 A1 Oct. 17, 2019

Related U.S. Application Data

(60) Division of application No. 15/379,111, filed on Dec. 14, 2016, now Pat. No. 10,331,970, which is a
(Continued)

(51) Int. Cl.
*G06K 9/00* (2006.01)
*G06K 9/46* (2006.01)
(Continued)

(52) U.S. Cl.
CPC .......... *G06K 9/4671* (2013.01); *G06K 9/46* (2013.01); *G06K 9/4642* (2013.01); *G06K 9/52* (2013.01);
(Continued)

(58) Field of Classification Search
CPC ...... G06K 9/4671; G06K 9/6201; G06K 9/52; G06K 9/4642; G06K 9/46; G06T 3/40; G06T 3/00
See application file for complete search history.

(56) References Cited

U.S. PATENT DOCUMENTS 6,526,156 B1  2/2003  Black et al.
6,711,293 B1  3/2004  Lowe
(Continued)

FOREIGN PATENT DOCUMENTS

CN  102693542 A  9/2012
EP  2 138 978 A2  12/2009
(Continued)

OTHER PUBLICATIONS

Office Action issued in Chinese Patent Application No. 201680034197.3 dated Nov. 5, 2019, 22 pages.
(Continued)

*Primary Examiner* — Aaron W Carter
(74) *Attorney, Agent, or Firm* — Mauriel Kapouytian Woods LLP; Andrew A. Noble

(57) ABSTRACT

Techniques are provided that include identifying robust features within a training image. Training features are generated by applying a feature detection algorithm to the training image, each training feature having a training feature location within the training image. At least a portion of the training image is transformed into a transformed image in accordance with a predefined image transformation. Transform features are generated by applying the feature detection algorithm to the transformed image, each transform feature having a transform feature location within the transformed image. The training feature locations of the training features are mapped to corresponding training feature transformed locations within the transformed image in accordance with the predefined image transformation, and a robust feature set is compiled by selecting robust features, wherein each robust feature represents a training feature having a training feature transformed location proximal to a transform feature location of one of the transform features.

29 Claims, 12 Drawing Sheets

Related U.S. Application Data continuation of application No. 14/696,202, filed on Apr. 24, 2015, now Pat. No. 9,558,426.

(60) Provisional application No. 61/983,971, filed on Apr. 24, 2014.

(51) Int. Cl.

| | | |
|---|---|---|
| *G06K 9/52* | (2006.01) | |
| *G06K 9/62* | (2006.01) | |
| *G06T 3/00* | (2006.01) | |
| *G06T 3/40* | (2006.01) | |

(52) U.S. Cl.
CPC .............. *G06K 9/6201* (2013.01); *G06T 3/00* (2013.01); *G06T 3/40* (2013.01)

(56) References Cited

U.S. PATENT DOCUMENTS

| | | | |
|---|---|---|---|
| 9,558,426 | B2 | 1/2017 | Song et al. |
| 10,268,950 | B2 | 4/2019 | Yin et al. |
| 10,331,970 | B2 | 6/2019 | Song et al. |
| 2009/0116749 | A1 | 5/2009 | Cristinacce et al. |
| 2009/0161962 | A1 | 6/2009 | Gallagher et al. |
| 2009/0297048 | A1 | 12/2009 | Slotine et al. |
| 2011/0038545 | A1 | 2/2011 | Bober et al. |
| 2011/0286627 | A1 | 11/2011 | Takacs et al. |
| 2011/0299770 | A1 | 12/2011 | Vaddadi et al. |
| 2011/0299782 | A1 | 12/2011 | Hamsici et al. |
| 2012/0170634 | A1 | 7/2012 | Wang et al. |
| 2012/0170835 | A1 | 7/2012 | Wang et al. |
| 2013/0279751 | A1 | 10/2013 | Bruna et al. |
| 2013/0322763 | A1 | 12/2013 | Heu et al. |
| 2014/0185924 | A1 | 7/2014 | Cao et al. |
| 2015/0023602 | A1 | 1/2015 | Wnuk et al. |
| 2015/0054824 | A1 | 2/2015 | Jiang |
| 2015/0207960 | A1 | 7/2015 | Tomlinson et al. |
| 2015/0254510 | A1 | 9/2015 | McKinnon et al. |
| 2015/0287228 | A1 | 10/2015 | Moraleda et al. |
| 2015/0294189 | A1 | 10/2015 | Benhimane et al. |
| 2017/0263019 | A1 | 9/2017 | Song et al. |

FOREIGN PATENT DOCUMENTS

| | | |
|---|---|---|
| JP | 2010079545 A | 4/2010 |
| JP | 2011053823 A | 3/2011 |
| JP | 2013097467 A | 5/2013 |
| WO | 2011/069021 A2 | 6/2011 |

OTHER PUBLICATIONS

Chum et al., "Locally Optimized RANSAC," Pattern Recognition, Springer Berlin Heidelberg, vol. 2781, 2003, 8 pages.

Li et al., "Worldwide Pose Estimation using 3D Point Clouds," Computer Vision—ECCV 2012, Springer Berlin Heidelberg, 14 pages.

Turcot et al., "Better Matching with Fewer Features: The selection of Useful Features in Large Database Recognition Problems," 2009 IEEE 12th International Conference on Computer Vision Workshops (ICCV Workshops), 8 pages.

Lowe, "Distinctive Image Features from Scale-Invariant Keypoints," International Journal of Computer Vision, vol. 60, Issue 2, Nov. 2004, pp. 91-110.

International Search Report and Written Opinion in International Application No. PCT/US2015/027655 dated Jul. 29, 2015, 13 pages.

Shih et al., "Data Driven Hallucination of Different Times of day from a Single Outdoor Photo," ACM Transactions on Graphics (TOG)—Proceedings of ACM SIGGRAPH Asia 2013, vol. 32, Issue 6, Nov. 2013, Article No. 200, 50 pages.

Chen et al., "Using image synthesis for multi-channel registration of different image modalities," Medical Imaging 2015: Image Processing, SPIE. 10 pages.

Vemulapalli et al., "Unsupervised Cross-modal Synthesis of Subject-specific Scans," 2015 IEEE International Conference on Computer Vision (ICCV), pp. 630-638.

Zhang, "Adobe Shows Off Features of Changing Time of Day Lighting and Removing Fog" http://petapixel.com/2014/10/10/adobe-shows-features-changing-time-day-lighting-removing-fog, Oct. 10, 2014, 13 pages.

International Search Report and Written Opinion in International Application No. PCT/US2017/021220 dated May 24, 2017, 14 pages.

Office Action issued in Japanese Patent Application No. 2017-507934 dated Jan. 23, 2018, 7 pages.

Yuasa et al., "Keypoint Selection based on Diverse Density for Image Retrieval," Technical report of IEICE. Multimedia and virtual environment, 2013, vol. 112, No. 386, 8 pages.

Yoshida et al., "Robust Planar Pose Estimation by Viewpoint Generative Learning," The Virtual Reality Society of Japan, 2012, vol. 17, No. 3, pp. 191-200.

Office Action issued in Taiwan Patent Application No. 106107643, dated May 9, 2018, 18 pages.

Office Action issued in Canadian Patent Application No. 3,014,670 dated Jun. 25, 2019, 4 pages.

ROBUST FEATURE IDENTIFICATION FOR IMAGE-BASED OBJECT RECOGNITION

CROSS REFERENCE TO RELATED APPLICATIONS

This application is a divisional of U.S. application Ser. No. 15/379,111, filed Dec. 14, 2016, which is a continuation of U.S. application Ser. No. 14/696,202, filed Apr. 24, 2015; and claims the benefit of U.S. Provisional Application No. 61/983,971, filed Apr. 24, 2014. These and all other extrinsic materials discussed herein are hereby incorporated herein by reference in their entirety.

TECHNICAL FIELD

This disclosure relates generally to image-based object recognition, and more specifically to feature identification techniques for image-based object recognition.

BACKGROUND

Various feature detection algorithms are used for image-based object recognition. At the most basic level, feature detection algorithms generate descriptors that provide a means to characterize, summarize and index distinguishing features of an image (e.g., shapes, objects, etc.) for purposes of image-based object recognition, search and retrieval. One example of a feature detection algorithm for image-based object recognition is the Scale Invariant Feature Transform (SIFT) feature detection algorithm, such as described in U.S. Pat. No. 6,711,293 to Lowe. For example, the SIFT feature detection algorithm may be applied to an image to generate descriptors for the numerous features within the image.

Machine-based object recognition generally comprises two distinct steps. First, training images of known objects are analyzed using a feature detection algorithm (e.g., a SIFT feature detection algorithm), which generates descriptors associated with features in the image data. Descriptors associated with many different objects can be packaged as a recognition library or database for deployment on a recognition device (e.g., a smartphone). Second, the recognition device captures a new "query" image of an object. The device applies the same image processing algorithm to the query image, thereby generating query image descriptors. The device then compares the query image descriptors to the training image descriptors in the recognition library. If there are sufficient matches, typically nearest neighbor matches, then the query image is considered to contain a representation of at least one of the known objects.

Unfortunately, a recognition library necessary for practical applications of image-based object recognition can be quite large with respect to typical mobile device (e.g., smartphone) storage capacities. This is especially true if the recognition library has to contain sufficient information to differentiate thousands of objects. For example, a typical SIFT descriptor may include 128 bytes of information. A data set of 1000 objects might then have 2,000,000 descriptors, which translates to a recognition library of 256 MB. Sufficiently large data sets are difficult to deploy on mobile devices, or even via a mobile communications network due to limited bandwidth and/or prohibitive data charges.

SUMMARY

In the past, many attempts have been made to improve recognition databases necessary for image-based object recognition, but there remains a need for techniques that allow for building compact and efficient recognition libraries for image-based object recognition.

Methods, systems and articles of manufacture for identifying robust features within a training image are described herein. The various embodiments can allow for building compact and efficient recognition libraries for image-based object recognition. In an embodiment, robust features are identified within a training image. The training image may be one of an undistorted image, an infrared-filtered image, an x-ray image, a 360-degree view image, a machine-view image, a frame of video data, a graphical rendering and a perspective-view of a three-dimensional object, and may be obtained by capturing a video frame of a video stream via an image capture device. Training features are generated by applying a feature detection algorithm to the training image, each training feature having a training feature location within the training image. At least a portion of the training image is transformed into a transformed image in accordance with a predefined image transformation. A plurality of image transformations may be presented to a user for selection as the predefined image transformation, and the predefined image transformation may be selected independently from a method used to capture the training image. Transform features are generated by applying the feature detection algorithm to the transformed image, each transform feature having a transform feature location within the transformed image. The training feature locations of the training features are mapped to corresponding training feature transformed locations within the transformed image in accordance with the predefined image transformation, and a robust feature set is compiled by selecting robust features, wherein each robust feature represents a training feature having a training feature transformed location proximal to a transform feature location of one of the transform features. Each of the training features and transform features may be described by a feature descriptor in accordance with the feature detection algorithm. Each of the training feature locations may comprise a pixel coordinate, and each of the transform feature locations may comprise a transformed pixel coordinate. The feature detection algorithm may include at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

In some embodiments, the predefined image transformation may comprise a geometric transform. The geometric transform may include at least one of a scaling, skewing, shearing and rotating transform.

In some embodiments, transforming at least a portion of the training image may include scaling the training image by a scaling factor to form the transformed image. The scaling factor may be based on one or more subject-matter characteristics of an image-based object recognition search, and the one or more subject-matter characteristics of the image-based object recognition search may be determined to be indicative of query images being predominantly at least one of near-sequence images, far-sequence images, skewed images, texture-rich images, medium texture images or texture-poor images. In some embodiments, the scaling factor may comprise a linear scaling factor between 50% and 90% of an original size of the training image. In some embodiments, the scaling factor may comprise a linear scaling factor between 75% and 80% of an original size of the training image.

In some embodiments, transforming at least a portion of the training image may include at least one of skewing, shearing, rotating and digitally transforming the training image by an angle to form the transformed image. In some embodiments, the angle may be between 20 degrees and 45 degrees.

In some embodiments, the predefined image transformation may comprise an image processing transform. The image processing transform may include at least one of a Gaussian filter, a color transform and lossy compression.

In some embodiments, transforming at least a portion of the training image may include applying a compound transform as the predefined image transformation to form the transformed image, the compound transform including a plurality of geometric transforms or image processing transforms. The compound transform may be determined based on one or more subject-matter characteristics of an image recognition search.

In some embodiments, one or more tuning parameters of the predefined image transformation may be adjusted and a second robust feature set may be generated based on the adjusted tuning parameters. The one or more tuning parameters may include at least one of a scaling factor and an angle, and may be automatically adjusted based on one or more subject-matter characteristics of an image recognition search.

In some embodiments, the adjusted tuning parameters may be optimized based on a recognized efficiency of the adjusted tuning parameters when used in relation to a test library of images. In some embodiments, the test library of images may not include the training image, and the adjusted tuning parameters may be validated based on the test library of images.

In some embodiments, compiling the robust feature set may include determining a transform feature location that is within a determined threshold distance of a training feature transformed location, and comparing a training feature associated with the training feature transformed location with a transform feature associated with the transform feature location based on a similarity measure. The similarity measure may be based on at least one of Euclidean distance, Hellinger distance and Hamming distance.

Various objects, features, aspects and advantages of the inventive subject matter will become more apparent from the following specification, along with the accompanying drawings in which like numerals represent like components.

Figure 1:
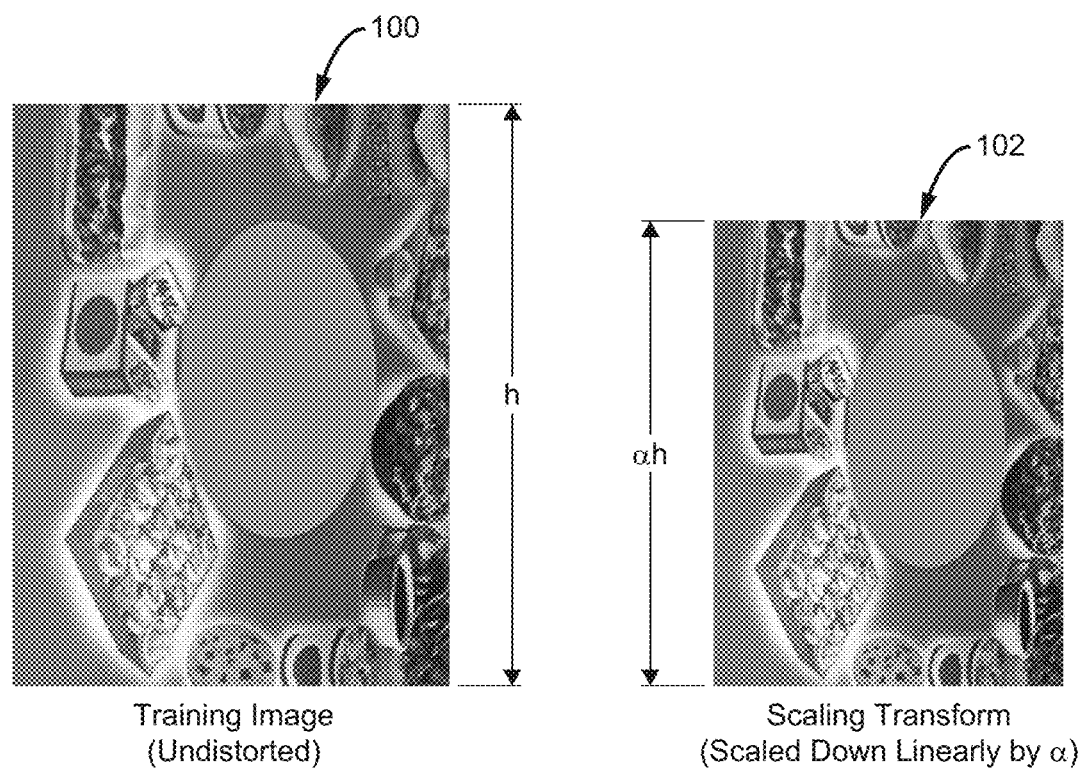
FIG. 1 illustrates an example of different geometric transformations of a training image in accordance with an embodiment.
Figure 1:
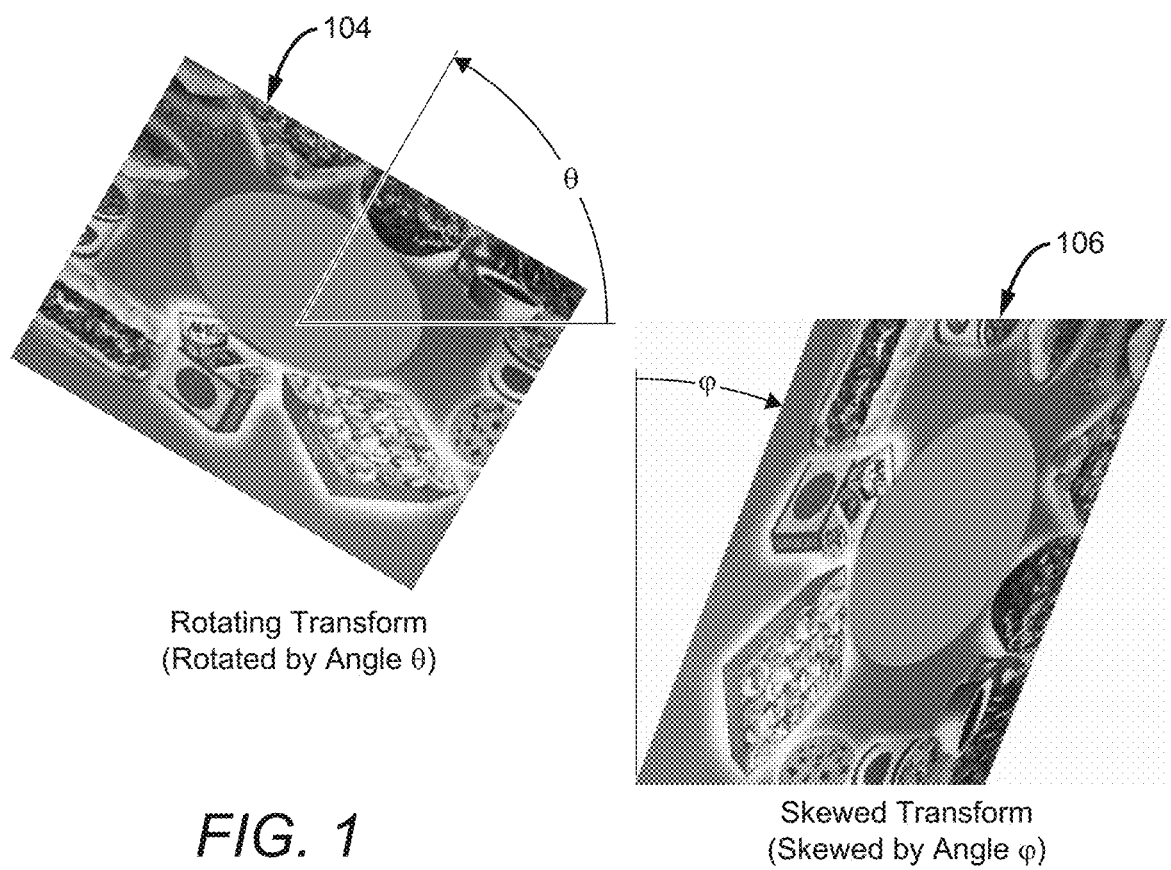

While the invention is described with reference to the above drawings, the drawings are intended to be illustrative, and other embodiments are consistent with the spirit, and within the scope, of the invention.

SPECIFICATION

The various embodiments now will be described more fully hereinafter with reference to the accompanying drawings, which form a part hereof, and which show, by way of illustration, specific examples of practicing the embodiments. This specification may, however, be embodied in many different forms and should not be construed as limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator, and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a," "an," and "the" includes plural references, and the meaning of "in" includes "in" and "on."

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing device structures operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The focus of the disclosed inventive subject matter is to enable construction or configuration of a computing device to operate on vast quantities of digital data, beyond the capabilities of a human. Although, in some embodiments, the digital data represents images, it should be appreciated that the digital data is a representation of one or more digital models of images, not necessarily the images themselves. By instantiation of such digital models in the memory of the computing devices, the computing devices are able to manage the digital data or models in a manner that could provide utility to a user of the computing device that the user would lack without such a tool. Thus, the disclosed devices are able to process such digital data in a more efficient manner according to the disclosed techniques.

One should appreciate that the disclosed techniques provide many advantageous technical effects including improving the scope, accuracy, compactness, efficiency and speed of digital image-based object recognition and retrieval technologies. It should also be appreciated that the following specification is not intended as an extensive overview, and as such, concepts may be simplified in the interests of clarity and brevity.

In accordance with the various embodiments, object instance retrieval, referred to herein in the context of image retrieval, image recognition and/or image-based object recognition, involves systems and methods of feature detection for an image dataset (referred to herein individually as "images" or "training images") in response to a given query image. Image recognition is made possible through the use of descriptors that characterize, summarize and index distinguishing features of an image. Large-scale image recognition can involve multiple servers running in parallel and image datasets of 10 million or more images per server (relative to image datasets of about 1 million images per server for medium-scale image recognition). However, due to the storage requirements for the descriptors that correspond to large image datasets, there is often a tradeoff between the memory footprint of image descriptors and image retrieval performance as measured by, for example, mean average precision (mAP). Therefore, the use of fewer image descriptors to characterize images is preferable to perform image recognition on a large scale.

Descriptors can be vectors that correspond to one or more distinguishable features of an image (e.g., shapes, objects, etc.). There are various methods for detecting image features and generating descriptors. For example, the scale-invariant feature transform (SIFT) is a currently popular image recognition algorithm used to detect and describe features of images. SIFT descriptors are 128-dimensions in order to be highly distinctive (i.e., distinguishable for matching purposes) and at least partially tolerant to variations such as illumination, three-dimensional (3D) viewpoint, etc. For example, one reference related to generating SIFT descriptors is D. Lowe, "Distinctive Image Features from Scale-Invariant Keypoints", International Journal of Computer Vision 60 (2), pages 91-110 (2004). In addition to SIFT descriptors, other alternative descriptors include Fast Retina Keypoint (FREAK) descriptors, Histograms of Oriented Gradient (HOG) descriptors, Speeded Up Robust Features (SURF) descriptors, DAISY descriptors, Binary Robust Invariant Scalable Keypoints (BRISK) descriptors, FAST descriptors, Binary Robust Independent Elementary Features (BRIEF) descriptors, Harris Corners descriptors, Edges descriptors, Gradient Location and Orientation Histogram (GLOH) descriptors, Energy of image Gradient (EOG) descriptors and Transform Invariant Low-rank Textures (TILT) descriptors. Typically, each image of an image dataset may include hundreds or thousands of features represented by descriptors. Therefore, practical system constraints will often require methods to both compress the amount of descriptors used to describe an image dataset, and to reduce in size the memory required to store the information contained in descriptors.

In the various embodiments herein, methods are provided to both compress the amount of descriptors used to describe an image dataset, and to reduce in size the memory required to store the information contained in descriptors, by identifying robust features in training image data. Rather than merely accepting all features and their associated descriptors as being relevant to image-based object recognition, the various embodiments herein aid in determining which of the features are robust to various perturbations (e.g., image transformations such as geometric transforms and image processing transforms). In addition, the various embodiments may save time over other typical training image ingestion techniques by utilizing only a single image of an object to determine robust features rather than multiple images. However, it is also contemplated that the various embodiments may be used to ingest multiple images of three-dimensional (3D) objects having a complex structure across multiple viewpoints.

In the various embodiments for identifying robust features presented herein, a geometric (e.g., scaling) transform and a SIFT feature detection algorithm are utilized as illustrative examples for the purposes of clarity and succinctness. However, it should be appreciated that other image transformations (e.g., other geometric transforms, image processing transforms, or combinations of transforms) and other feature detection algorithms may be utilized to carry out the various embodiments. It should be further appreciated that various other image transformations may be utilized based on the particular feature detection algorithm utilized or based on particular characteristics of subject matter known to be represented by the training images.

FIG. 1 illustrates an example of different geometric transformations of a training image in accordance with an embodiment. In FIG. 1, training image 100 illustrates an image of an object having a height h. For example, training image 100 may be one of an undistorted image, an infrared-filtered image, an x-ray image, a 360-degree view image, a machine-view image, a frame of video data, a graphical rendering and a perspective-view of a three-dimensional object. In some embodiments, training image 100 may be obtained by capturing a video frame of a video stream via an image capture device or from a broadcast (e.g., television, movie, etc.). For the purposes of example only, training image 100 is illustrated as being a medium texture object.

At least a portion of training image 100 may be transformed into a transformed image by an a priori defined (i.e., predefined) image transformation, such as illustrated by transformed images 102, 104 and 106. In an embodiment, the a priori defined (i.e., predefined) image transformation may be at least one of a geometric transform (as shown) or an image processing transform that is selected automatically or presented to a user for selection. Further, the predefined image transformation may be selected independently from a method used to capture the training image. As such, the predefined image transformation may be selected to streamline a training image ingestion process, such as by automatically applying the same predefined image transformation to each of a plurality of training images regardless of their origin.

In some embodiments, the predefined image transformation may be selected based on particular characteristics of subject matter known to be represented by the training images (e.g., texture-rich children's toys, texture-poor logos, printed media, streetscape images, cityscape images, etc.). Moreover, the predefined image transformation may be based on characteristics of expected query images, such as query images that are expected to be predominantly at least one of near-sequence images, far-sequence images, skewed images, texture-rich images, medium texture images or texture-poor images. For example, predominantly near-sequence query images may be expected from a search known to involve printed media, while predominantly far-sequence images may be expected from a search known to involve streetscape images, cityscape images or CCTV/security camera images.

In an embodiment, transforming training image 100 to form a transformed image may include scaling (e.g., up-scaling or down-scaling) the training image by a scaling factor. For example, transformed image 102 illustrates a training image that has been scaled down linearly by a linear scaling factor α. In an embodiment, the linear scaling factor α may preferably be between 0.5 (e.g., 50%) and 0.9 (e.g., 90%), and more particularly between 0.75 (e.g., 75%) and 0.8 (e.g., 80%). For example, based on the methods described below for reducing the number of features needed to describe a training image by identifying robust features, a linear scaling factor of about 0.8 (e.g., 80%) may achieve about a 50% reduction in a recognition database size without a loss in recognition performance. In some embodiments, the scaling factor may be based on one or more subject-matter characteristics of an image-based object recognition search.

In an embodiment, transforming training image 100 to form a transformed image may include rotating the training image by an angle. For example, transformed image 104 illustrates a training image that has been rotated by an angle θ. The angle θ may be selected based on creating a desired amount of perturbation for identifying robust features. For example, an angle θ=20 degrees may be a minimum angle that can bring about considerable rotation change between training image 100 and transformed image 102. As such, an angle below 20 degrees may make the images look very similar, such that there may not be enough perturbation to identify robust features. For example, the robust feature in such a circumstance may comprise 70% or 80% of an original feature set. However, an angle θ above 45 degrees may be an upper-bound angle since rotation is highly symmetric. For example, an angle θ=70 degrees would result in a rotation that would be substantially equivalent to a 20-degree rotation followed by an opposite-direction 90-degree rotation (which would make a very small difference to SIFT feature detection). As such, the 70-degree would be equivalent to a 20-degree rotation for the purposes of SIFT detection. Likewise, a 160-degree would be equivalent to a 20-degree rotation following a 180-degree rotation. Therefore, in an embodiment, rotating angle θ is preferably between 20 degrees and 45 degrees.

In an embodiment, transforming training image 100 to form a transformed image may include skewing or shearing the training image by a skewing angle φ. For example, transformed image 106 illustrates a training image that has skewed by an angle φ. The angle φ may be selected based on creating a desired amount of perturbation for identifying robust features. For example, an angle φ=20 degrees may be a minimum angle that can bring about change between training image 100 and transformed image 102. As such, an angle φ below 20 degrees may make the images look very similar, such that there may not be enough perturbation to identify robust features. However, an angle φ above 45 degrees may create too large of a distortion to transformed image 102 such that very few features would survive the transformation to be identified as robust features, which may lead to degraded recognition performance. Therefore, in an embodiment, skewing angle φ is preferably between 20 degrees and 45 degrees.

In some embodiments, a plurality of different image transformations may be combined into a compound transform. For example, a plurality of geometric transforms and/or image processing transforms (e.g., including a Gaussian filter, a color transform and/or lossy or non-lossy compression) may be selected in combination to transform training image 100 into a transformed image. In some embodiments, a compound transform may be determined based on one or more known characteristics of a camera or other image capture device (e.g., focal length, aperture, zoom range, blurring, etc.). Thus, the compound transform may simulate or model the capturing of an image by such an image capture device, or a circumstance under which a query image might be taken by such an image capture device. Further, in some embodiments, a compound transform may be determined based on one or more subject-matter characteristics of an image-based object recognition search. As such, it should be appreciated that other image transformations, or combinations of image transformations, are possible and that the examples shown in FIG. 1, while exemplary, are merely illustrative of the image transformations that can be utilized to transform training image 100 to form a transformed image.

Robust features are considered a subset of features in an image that are determined to survive perturbations, such as an image transformation. For example, a feature detection algorithm may be applied to training image 100 to generate training features, where each training feature has a training feature location (e.g., a pixel coordinate) within the training image. Likewise, the feature detection algorithm may be applied to a transformed image, such as one of transformed images 102, 104 and 106, to generate transform features, where each transform feature has a transform feature location (e.g., a transform pixel coordinate) within the transformed image. A robust feature set for training image 100 may then be determined by identifying the training features that have a training feature transformed location (i.e., a location mapped to a corresponding transformed image location) proximal to a transform feature location of one of the transform features.

Figure 2A:
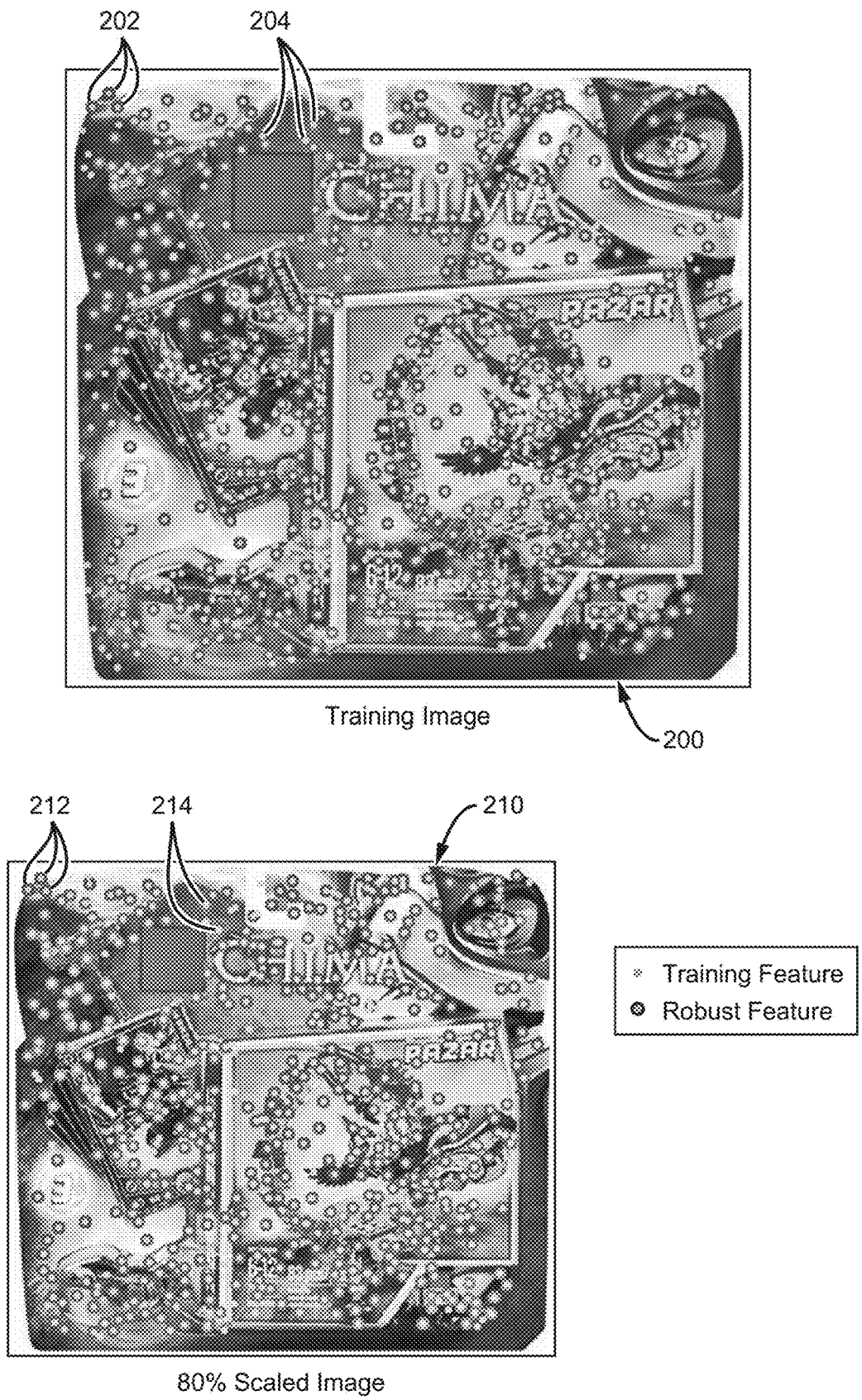
FIG. 2A illustrates an example of a geometric image transformation of a texture-rich training image in accordance with an embodiment.

FIG. 2A illustrates an example of a geometric image transformation of a texture-rich training image in accordance with an embodiment. Training image 200 illustrates a texture-rich training image (e.g., an image of a typical children's toy package) that, after the application of a SIFT feature detection algorithm, has been determined to have 1149 SIFT training features (e.g., training features 202 and 204). For the sake of clarity, not all of the training features are shown. Training image 200 has been transformed to form transformed image 210. Transformed image 210 is scaled down linearly by a scaling factor of 0.8 (i.e., 80%), while maintaining the aspect ratio of training image 200. After the application of the SIFT feature detection algorithm, transformed image 210 has been determined to have 786 SIFT transform features (e.g., transform features 212 and 214). For the sake of clarity, not all of the transform features are shown. It should be noted that not all of the 786 transform features correspond to training features. For example, down-scaling training image 200 may cause some detected training features (e.g., training features 204) to have no corresponding transform features in transformed image 210. In other instances, down-scaling training image 200 may cause transform features (e.g., transform features 214) to appear in transformed image 210 that do not have corresponding training features. For example, in transformed image 210, out of the 786 transform features, 550 transform features (e.g., transform features 212) correlate with training features (e.g., training features 202) from training image 200. These 550 transform features are considered to be robust against the perturbation of down-scaling training image 200. As such, about 48% (i.e., 100*550/1149) of the training features in training image 200 may be considered to be robust features.

Figure 2B:
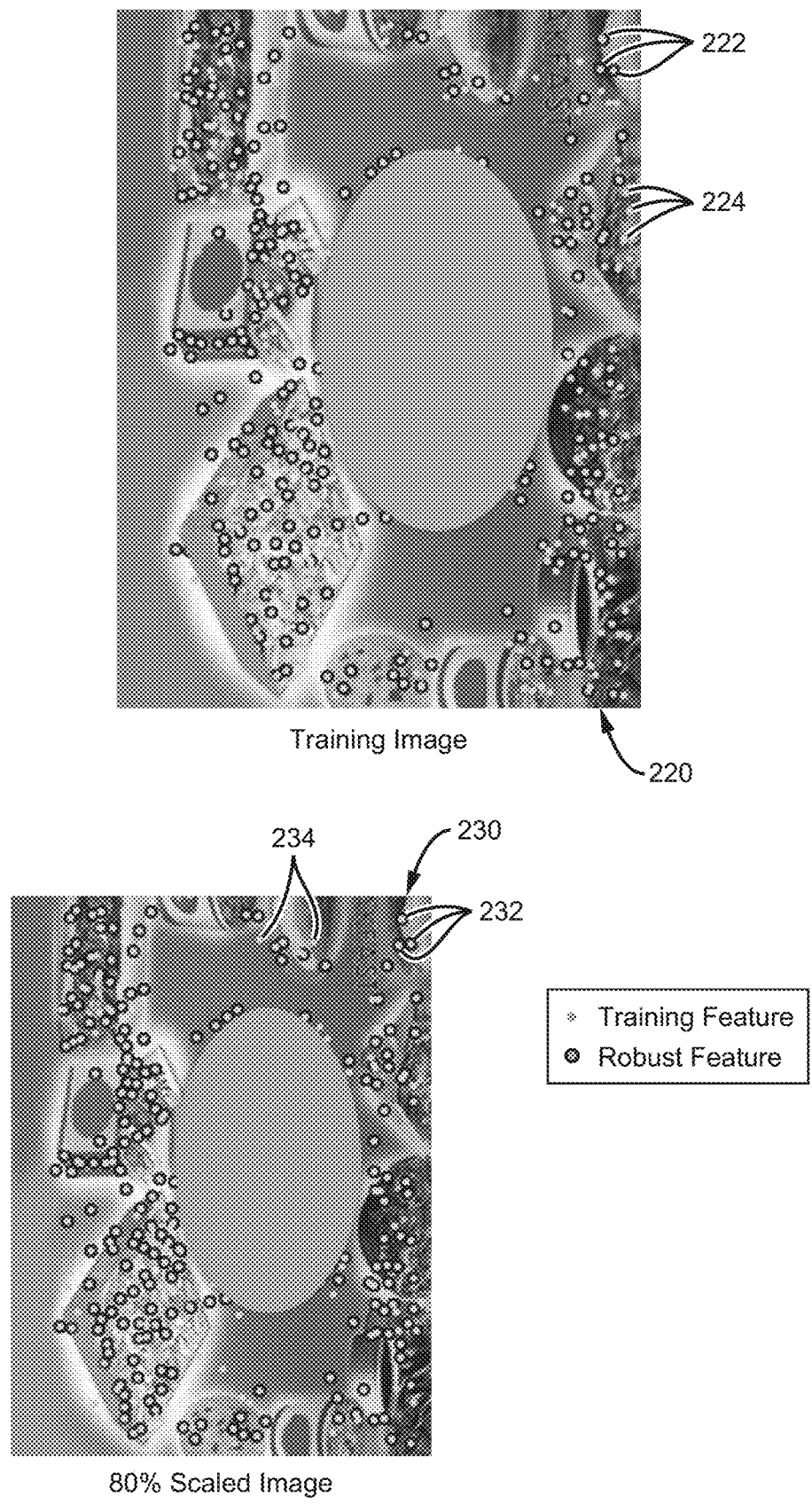
FIG. 2B illustrates an example of a geometric image transformation of a medium texture training image in accordance with an embodiment.

FIG. 2B illustrates an example of a geometric image transformation of a medium texture training image in accordance with an embodiment. Training image 220 illustrates a medium texture training image that, after the application of a SIFT feature detection algorithm, has been determined to have 707 SIFT training features (e.g., training features 222 and 224). For the sake of clarity, not all of the training features are shown. Training image 220 has been transformed to form transformed image 230. Transformed image 230 is scaled down linearly by a scaling factor of 0.8 (i.e., 80%), while maintaining the aspect ratio of training image 220. After the application of the SIFT feature detection algorithm, transformed image 230 has been determined to have a plurality of transform features (e.g., transform features 232 and 234). For the sake of clarity, not all of the transform features are shown. As in FIG. 2A, it should be noted that not all of the transform features correspond to training features. For example, down-scaling training image 220 may cause some detected training features (e.g., training features 224) to have no corresponding transform features in transformed image 230. In other instances, down-scaling training image 220 may cause transform features (e.g., transform features 234) to appear in transformed image 230 that do not have corresponding training features. For example, in transformed image 230, 318 transform features (e.g., transform features 232) correlate with training features (e.g., training features 222) from training image 220. These 318 transform features are considered to be robust against the perturbation of down-scaling training image 220. As such, about 45% of the training features in training image 220 may be considered to be robust features.

Figure 2C:
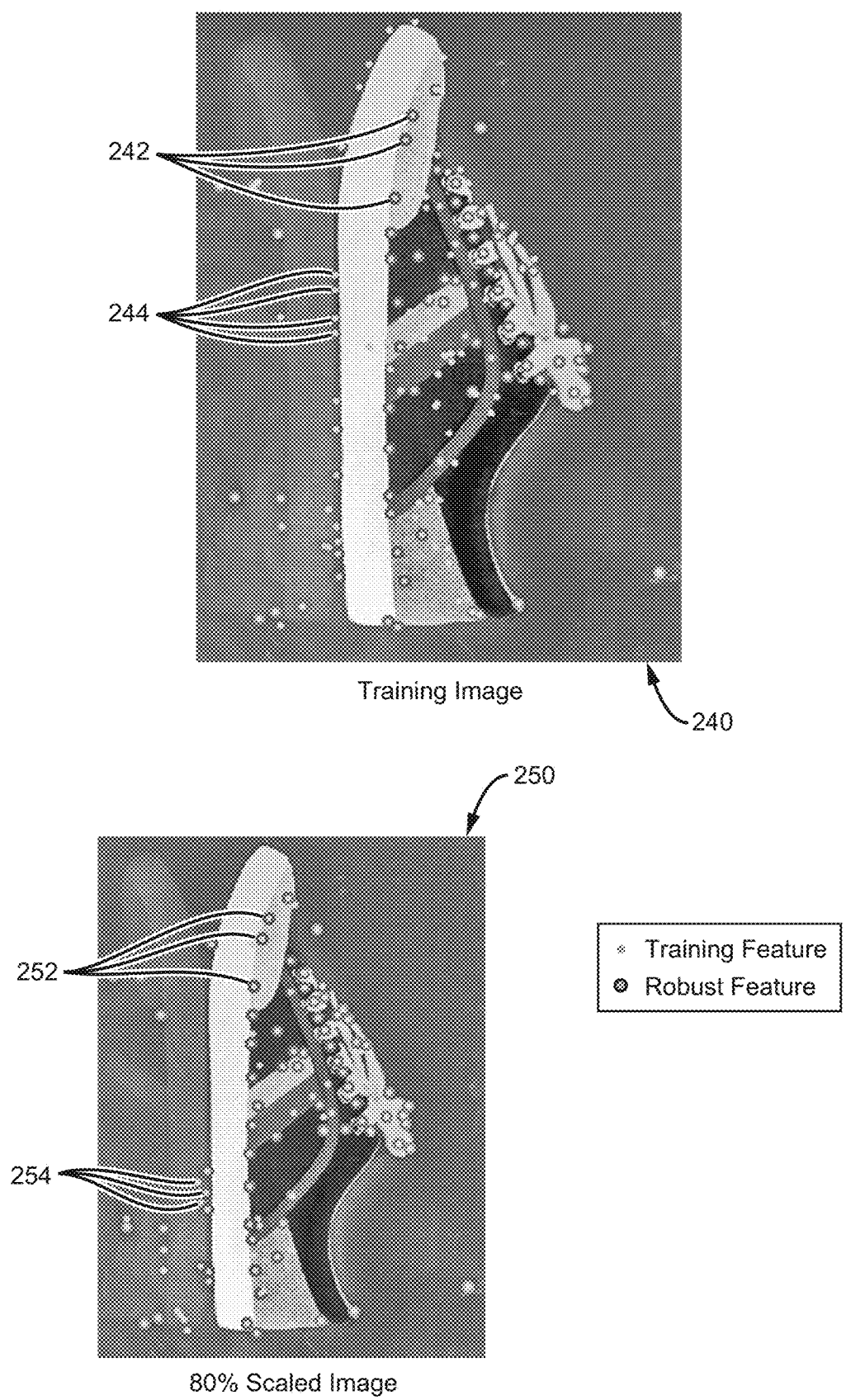
FIG. 2C an example of a geometric image transformation of a texture-poor training image in accordance with an embodiment.

FIG. 2C an example of a geometric image transformation of a texture-poor training image in accordance with an embodiment. Training image 240 illustrates a texture-poor training image that, after the application of a SIFT feature detection algorithm, has been determined to have a plurality of SIFT training features (e.g., training features 242 and 244). For the sake of clarity, not all of the training features are shown. Training image 240 has been transformed to form transformed image 250. Transformed image 250 is scaled down linearly by a scaling factor of 0.8 (i.e., 80%), while maintaining the aspect ratio of training image 240. After the application of the SIFT feature detection algorithm, transformed image 250 has been determined to have a plurality of SIFT transform features (e.g., transform features 252 and 254). For the sake of clarity, not all of the transform features are shown. As in FIGS. 2A and 2B above, it should be noted that not all of the transform features in transformed image 250 correspond to training features in training image 240. For example, down-scaling training image 240 may cause some detected training features (e.g., training features 244) to have no corresponding transform features in transformed image 250. In other instances, down-scaling training image 240 may cause transform features (e.g., transform features 254) to appear in transformed image 250 that do not have corresponding training features. About 53% of the training features (e.g., training features 242) in training image 240 are considered to be robust in that they have corresponding transform features (e.g., transform features 252) in transformed image 250.

Thus, in FIGS. 2A-2C an 80% scale transformation retains about 50% of training features as robust features. This ratio would translate into a 50% reduction in size of the storage space required to contain the training image features (i.e., a 50% reduction in the size of an image recognition database) if only the robust features are stored. Moreover, FIGS. 2A-2C illustrate that generating robust features, as described below, is substantially invariant with respect to texture.

Figure 3:
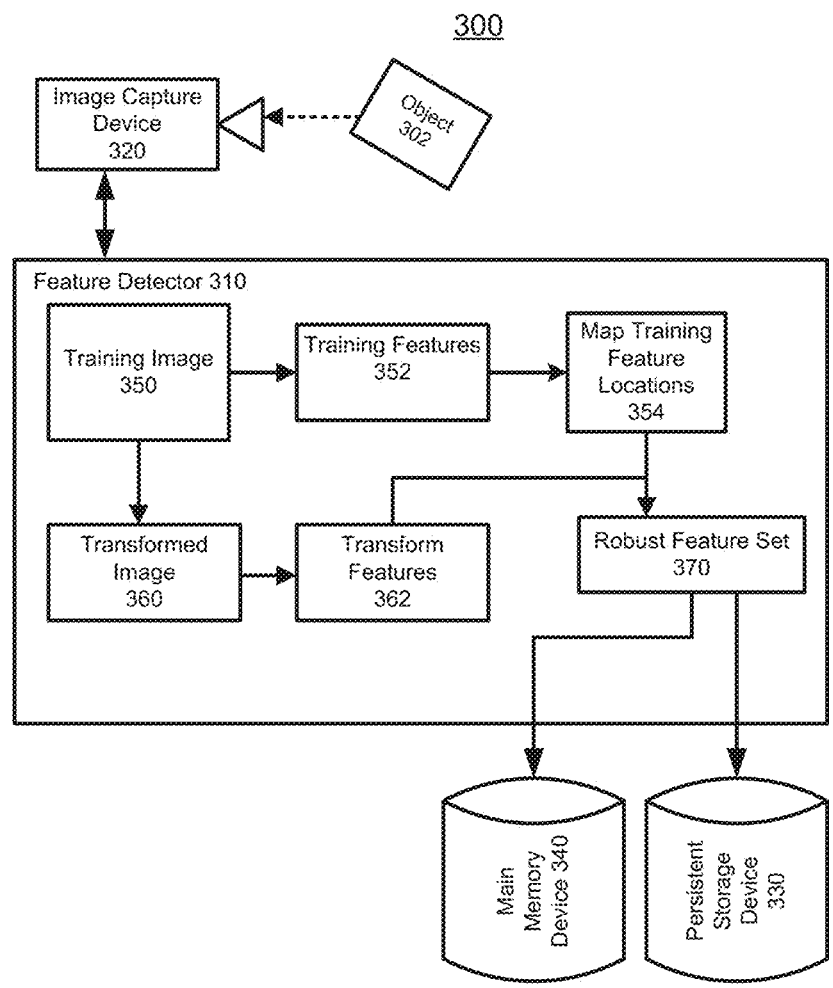
FIG. 3 illustrates a block diagram of a system for identifying robust features within a training image in accordance with an embodiment.

FIG. 3 illustrates a block diagram of a system for identifying robust features within a training image in accordance with an embodiment. In block diagram 300, elements for identifying robust features include a feature detector 310, image capture device 320, a persistent storage device 330 and a main memory device 340. However, it should be noted that the elements in FIG. 3, and the various functions attributed to each of the elements, while exemplary, are described as such solely for the purposes of ease of understanding. One skilled in the art will appreciate that one or more of the functions ascribed to the various elements may be performed by any one of the other elements, and/or by an element (not shown) configured to perform a combination of the various functions.

In an embodiment, feature detector 310 is configured to identify robust features within a training image 350. In some embodiments, training image 350 represents a two-dimensional (2D) representation of an object 302, as may be found in a typical photograph, image, or video frame. Alternatively, training image 350 may be a distorted image generated by utilizing atypical filters or lenses (e.g., a fish-eye lens). Moreover, training image 350 may be a machine or robot-view of an object based on one or more of infrared (IR) filters, X-rays, 360-degree perspective views, etc. As such, training image 350 may be one of an undistorted image, an infrared-filtered image, an x-ray image, a 360-degree view image, a machine-view image, a frame of video data, a graphical rendering and a perspective-view of a three-dimensional object, and may be obtained by capturing a video frame of a video stream via an image capture device, such as image capture device 320.

In some embodiments, image capture device 320 may be a device that is either external (as shown) or internal to feature detector 310 for generating or otherwise obtaining an image of training object 302. For example, image capture device 320 may comprise a remote server (e.g., a Platform-as-a-Service (PaaS) server, an Infrastructure-as-a-Service (IaaS) server, a Software-as-a-Service (SaaS) server, or a cloud-based server), or a remote image database coupled to feature detector 310 via a communications network. In another example, image capture device 320 may include a digital still-image or video camera configured to capture images and/or frames of video data. In another example, image capture device 320 may comprise a graphical rendering engine (e.g., a gaming system, image-rendering software, etc.) where the training image is a generated image of an object rather than a captured image.

In an embodiment, feature detector 310 is configured to generate training features 352 by applying a feature detection algorithm to the training image 350, where each training feature has a training feature location within the training image 350. For example, each training feature location may comprise a pixel coordinate and be described by a feature descriptor in accordance with the feature detection algorithm. The feature detection algorithm may include at least one of a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG) or Transform Invariant Low-rank Textures (TILT) feature detection algorithm.

In an embodiment, feature detector 310 is configured to transform at least a portion of the training image 350 into a transformed image 360 in accordance with a predefined image transformation. In some embodiments, feature detector 310 may be configured to present a plurality of image transformations to a user for selection as the predefined image transformation, and to receive a selection from the user via, for example, a user interface (not shown). In some embodiments, feature detector 310 may include an API, or leverage an external API, through which the predefined image transformation may be obtained. The predefined image transformation may comprise at least one of a geometric transform (e.g., at least one of a transform that includes skewing, shearing or rotating the training image) and/or an image processing transform (e.g., a transform including at least one of a Gaussian filter, color transform or lossy compression). In some embodiments, the predefined image transformation may be a compound transform including, for example, a plurality of geometric transforms and/or image processing transforms.

The predefined image transformation may comprise a broad spectrum of features. In a mathematical sense, the predefined image transformation may comprise a matrix operation that translates a 2D image (e.g., a 2D array of pixel information) into a new transformed image space (e.g., a higher dimension image space). Examples of image transformations include a geometric transform, a lighting transform, and an image processing transform including a compression transform (e.g., lossy, non-lossy, etc.), a color transform, Gaussian filters, or other types of transforms.

In an embodiment, feature detector 310 generates transform features 362 by applying the feature detection algorithm to the transformed image 360, where each transform feature has a transform feature location within the transformed image. For example, each transform feature location may comprise a transformed pixel coordinate and be described by a feature descriptor in accordance with the feature detection algorithm.

In an embodiment, feature detector 310 is then configured to map 354 the training feature locations of the training features to corresponding training feature transformed locations within the transformed image in accordance with the predefined image transformation. As such, the expected locations of the training features are determined within the transformed feature space.

In an embodiment, feature detector 310 then compiles a robust feature set 370 by selecting robust features, wherein each robust feature represents a training feature having a training feature transformed location proximal to a transform feature location of one of the transform features. For example, compiling the robust feature set may include determining a transform feature location that is within a determined threshold distance of a training feature transformed location, and comparing a training feature associated with the training feature transformed location with a transform feature associated with the transform feature location based on a similarity measure. The similarity measure may be based on at least one of Euclidean distance, Hellinger distance and Hamming distance.

In some embodiments, feature detector 310 may be further configured to facilitate an image-based object recognition search by storing the robust feature set 370 for comparison with a query image. For example, query image feature data stored in, e.g., main memory device 340, may be used to conduct an image-based object recognition search between the query image feature data and the robust feature sets for a plurality of training images, such as may be stored in persistent storage device 330 and/or main memory device 340. In some embodiments, the robust feature sets may be stored to facilitate a nearest neighbor search between the robust features and query image features, such as a search based on, for example, a k-d tree, spill tree or other nearest neighbor ranking technique.

In some embodiments, feature detector 310 may be further configured to adjust one or more tuning parameters of the predefined image transformation and generate a second robust feature set based on the adjusted tuning parameters. For example, the one or more tuning parameters may include at least one of a scaling factor and an angle, and may be automatically adjusted based on one or more subject-matter characteristics of an image recognition search. In some embodiments, feature detector 310 may be further configured to optimize the adjusted tuning parameters based on a recognized efficiency of the adjusted tuning parameters when used in relation to a test library of images. For example, the adjusted tuning parameters may be validated based on the test library of images that may, or may not, include the training image.

Figure 4:
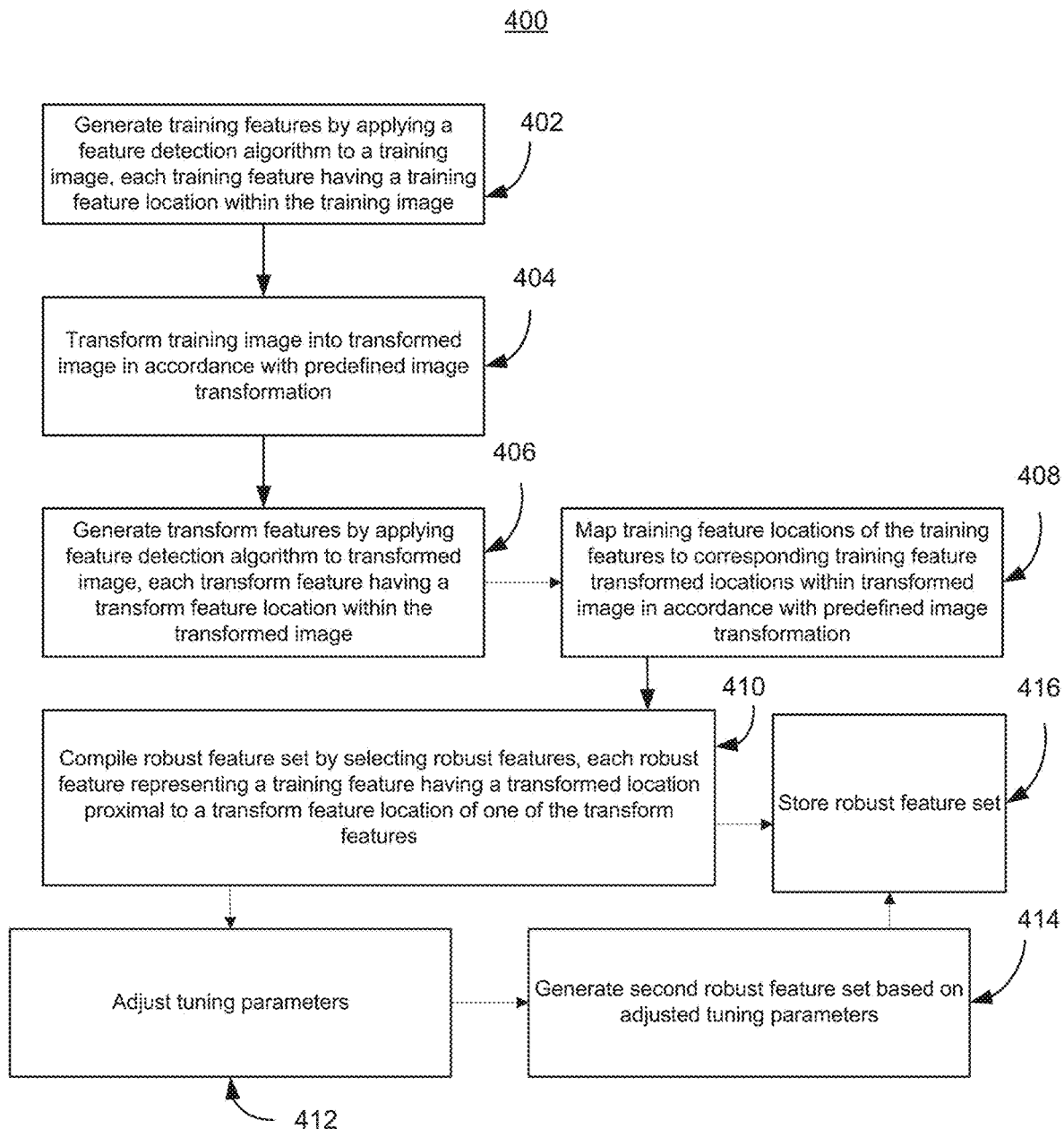
FIG. 4 illustrates a flow diagram of example operations for identifying robust features within a training image in accordance with an embodiment.

FIG. 4 illustrates a flow diagram of example operations for identifying robust features within a training image in accordance with an embodiment. It should be appreciated that method 400 is executed by one or more computing devices configured to or programmed to have the disclosed roles or responsibilities of a feature detector, such as feature detector 310. For example, the feature detector may comprise a computer server farm where each server is configured with, e.g., a SIFT-based image analysis package. Therefore, in some embodiments, the feature detector may ingest millions of training images for processing according method 400. Further, the feature detector may include an image capture device (e.g., a video camera or a gaming console) equipped to capture image frames of video data according to method 400, such as in real-time.

At step 402, training features are generated by applying a feature detection algorithm to a training image, each training feature having a training feature location within the training image. In some embodiments, a SIFT feature detection algorithm is utilized. However, the feature detection algorithm could also include SURF, DAISY, FAST, Harris Corners, BRISK, TILT, or other existing feature detection algorithms or those yet to be invented. A training feature includes a training feature location within the training image, possibly represented as a pixel coordinate (e.g., a coordinate described by an x-axis and y-axis Cartesian coordinate). Further, the training feature also includes a descriptor by which images may be recognized or matched. For example, a SIFT feature may comprise a 128-dimension vector, or a 36-dimension vector, depending on how the SIFT feature detection algorithm is configured.

At step 404, at least a portion of the training image is transformed into a transformed image in accordance with a predefined image transformation. For example, the transformed image may be a computer-generated image derived from the training image. As such, additional transformed images may be generated as needed or as desired without having to capture multiple images, or having to recapture images, of the same subject matter. In some embodiments, rather than transforming the entire training image, selected patches of the training image may be transformed, e.g., patches around selected or determined training feature location clusters.

At step 406, transform features are generated by applying the feature detection algorithm to the transformed image, each transform feature having a transform feature location within the transformed image. For example, the feature detection algorithm may generate newly observed features caused by the perturbation of the training image, generate the same features as observed in the training image, or fail to generate similar features as in the training image. In a similar vein as the training features, each transform feature comprises descriptors as well as transform feature locations within the transformed image. The transform feature locations may be quantified as transformed pixel coordinates in the transformed image space.

The training feature locations of the training features are mapped to corresponding training feature transformed locations within the transformed image in accordance with the predefined image transformation at step 408. For example, if $\mathbb{T}$ is the transform, then a pixel of the training image (x, y) would be translated to (x', y') where (x', y')=$\mathbb{T}$·(x, y). In essence, step 408 projects where the initial training features would reside in the transformed image should they survive perturbation due to the transformation. As such, the feature detector may compile a list of where there the training features should be in the transformed image and a list of detected features from the transformed image.

At step 410, a robust feature set is compiled by selecting robust features, wherein each robust feature represents a training feature having a training feature transformed location proximal to a transform feature location of one of the transform features. As such, the feature detector may establish a correlation between training features and transformed features. If a correlation between a training feature and a transformed feature is established, then the feature is considered robust. The correlation of the training features and transformed features can be performed according to various methods. In some embodiments, the correlation may include measuring a distance between a projected training feature transformed location and a transform feature location (e.g., a Euclidian distance, etc.). If the distance is less than a threshold value (e.g., an adjustable parameter), then the feature(s) are considered robust. Additionally, a distance between a projected training feature transformed location and a transform feature location may be based on a similarity measure. For example, the descriptors of the proximal training feature and the transform feature may be compared, e.g., as a normalized dot product where the closer the dot product is to the value of one, the more similar the descriptors. In some embodiments, the similarity measure may comprise a Hamming distance (e.g., based on the presence of values in each member of the descriptor vectors), a Euclidean distance and/or a Hellinger distance.

The robust feature set may be stored at step 416, e.g., on a computer-readable medium. For example, the robust feature set may be stored in a server to be used as a distal (remote) object recognition service, or may be packaged for deployment on a portable or mobile device (e.g., a smartphone). In some embodiments, robust feature sets may be stored as a tree structure (e.g., a spill tree, k-d tree, etc.) where the robust feature descriptors comprise the leaves of the tree structure. Moreover, other information related to facilitating an image-based object recognition search may be stored with the robust feature set, including, e.g., information regarding relevant descriptors, image patches from which relevant descriptors can be derived, and/or information regarding significant image frames.

In one embodiment, compiling the robust feature set may comprise a two-step process including determining a transform feature location that is within a determined threshold distance of a training feature transformed location, and then comparing a training feature associated with the training feature transformed location with a transform feature associated with the transform feature location based on a similarity measure. For example, determining a transform feature location that is within a determined threshold distance of a training feature transformed location may be based on a threshold geometric distance between the pixel locations of the transform feature and the transformed training feature. If the pixel location are within the determined threshold distance, the descriptor of the training feature and the descriptor of the transform feature may be compared based on a similarity measure, such as a Hamming distance, a Euclidean distance and/or a Hellinger distance.

At optional step 412, one or more tuning parameters of the predefined image transformation may be adjusted and a second robust feature set may be generated based on the adjusted tuning parameters at optional step 414. In some embodiments, the one or more tuning parameters may include at least one of a scaling factor and an angle, and may be automatically adjusted based on one or more subject-matter characteristics of an image recognition search. For example, a linear down-scaling factor may include a variable value between 0 and 1 that represents a fraction by which the training image should be scaled. As such, adjusting the one or more tuning parameters may include determining values of parameters that may provide desirable reductions in the recognition database size while maintaining a recognition performance level. Moreover, in some embodiments each domain of subject matter (e.g., toys, consumer goods, vehicles, clothing, games, devices, people, buildings, etc.) or each feature detection algorithm may have different optimized parameters, even for the same image transformation, based on one or more known subject-matter characteristics.

In some embodiments, the adjusted tuning parameters may be optimized based on a recognized efficiency of the adjusted tuning parameters when used in relation to a test library of images. For example, the various robust feature sets may be tested against a test library of images to determine which adjusted parameters provide the best recognition performance (e.g., smallest effective recognition library, size of library, recognition efficiency, latency, etc.). In some embodiments, the adjusted tuning parameters may be validated based on a test library of images does not include the training image.

Figure 5:
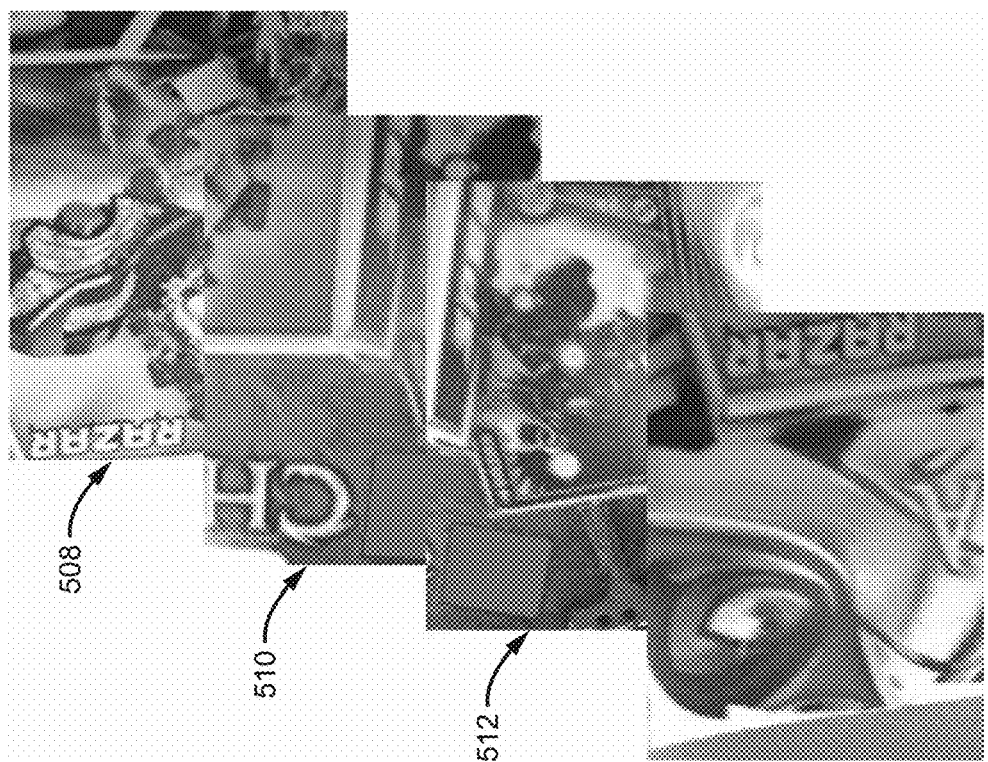
FIG. 5 illustrates an example of image-based object recognition search query images used to determine an optimized set of transformation parameters in accordance with an embodiment.
Figure 5:
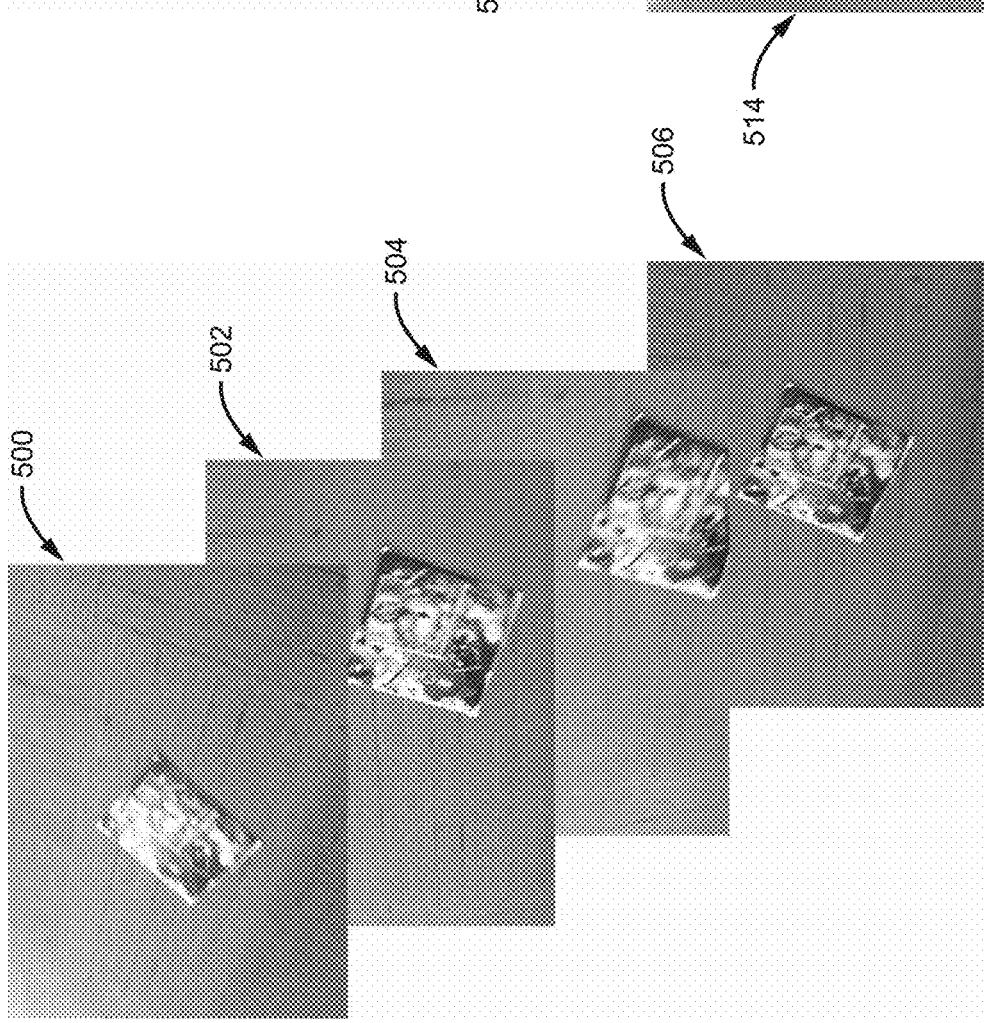

FIG. 5 illustrates an example of image-based object recognition search query images used to determine an optimized set of transformation parameters in accordance with an embodiment. The embodiments herein identify robust features that are useful for both far-object and near-object recognition searches. Far-object recognition represents a scenario where a target object represents a small fraction of a field-of-view in a query image, such as, e.g., an individual building in a cityscape image, a person in a room-monitoring security camera/CCTV video frame, an individual workstation in a video frame of an assembly line quality control camera, or vehicular traffic in a video frame of a freeway-monitoring traffic camera. Near-object recognition represents a scenario where the target object, or more likely a portion of the target object, fills all or substantially all of the field-of-view in a query image, e.g., text on a printed page, a person in security camera/CCTV video frame of an ATM machine video monitor, or a patient in a video frame/image of a medical diagnostic or surgical camera system. As an example, FIG. 5 illustrates images of the texture-rich object (see FIG. 2A) showing examples of query images 500, 502, 504 and 506 utilized for far-object recognition and examples of query images 508, 510, 512 and 514 utilized for near-object recognition. As shown, typical far-object and near-object recognition query images may be rotated, skewed, blurred, cropped, or any combination thereof. Moreover, the anticipated quality of the query images may be determined based on the known subject-matter of an image-based object recognition search (e.g., query images known to be associated with a search related to children's toys are likely to be cropped, blurred, skewed, etc. based on the likely skills of a child operating the query image capture device.)

In an embodiment, the predefined image transformation applied to the training images can be tuned to generate robust features that are useful in both far-object recognition and near-object recognition. Thus, a series of analysis images were collected to determine optimized parameters for the transformation that yield an acceptable recognition metric or efficiency. These analysis images represent captured images of a target object and include far sequence images 500, 502, 504, 506 and near sequence images 508, 510, 512, 514. For purposes of analysis, with respect to a texture-rich image (see FIG. 2A), the far sequence of images included 161 images (not shown in their entirety) and the near sequence of images included 113 images (not shown in their entirety).

For the purposes of the optimization, the metric (Y) to be optimized was defined as:

$$Y = \frac{\# \text{ of Useful Features}}{\# \text{ of Training Features}} \cdot \frac{\# \text{ of Test Image}}{\# \text{ of Recog. Test Image}}$$

where the # of Useful Features represents the robust features determined by the embodiments herein for a given set of transformation parameters and the # of Training Features represents the number of features (e.g., SIFT features) derived from the training image. The # of Test Images represents the total number of images for the given sequence (e.g., near-sequence or far-sequence images). The # of Recog.Test Image represents the number of correct matches.

It will be appreciated that the first term of Y tends to drive the value of Y down; a desirable trait as it reduces the size of a recognition database. The second term of Y is always greater than or equal to one, where a value of one in the second term would indicate all images were recognized. Thus, both terms compete in a manner to balance each other for ranges of practical values of the transformation parameters (e.g., 0 features makes Y zero, which is not practical) in a manner where low value of Y indicates more preferred transformation parameters.

With respect to image recognition performance, each of the resulting robust feature sets for FIGS. 2A-2C were tested against a test library storing over 300 test images for the corresponding subject matter. The recognition efficiency (e.g., number of test images ($N_t$) divided by match counts ($M_c$) from robust features; $100*M_c/N_t$) was 79%, 76%, and 71% for each of images respectively, as opposed to 85%, 82%, 71% using original training features. Only 6% performance dropdown is found in first two images. In an embodiment, the performance may be improved by using one or more verifiers as discussed in co-owned U.S. Provisional Patent Application Ser. No. 61/946,650 titled "Image Recognition Verification", filed Dec. 12, 2013. For example, using typical recognition techniques (e.g., a SIFT feature detection algorithm with no verifier) a test was run on 661 images. The original database comprised 1,379,531 features and had a size of 253.7 MB. The standard technique of using the unfiltered SIFT feature detection algorithm correctly identified a first match 81% of the time. Using the embodiments herein, the database was reduced down to 654,828 features using an 80% linear scaling factor, and the database had a size of 121.9 MB; more than 50% reduction in size. Coupling the recognition step with the verifier results in a first match hit rate of 79%; a negligible difference in recognition performance. Moreover, the latency during the image matching process was reduced due to the reduction in database size even though verifiers were used.

Figure 6A:
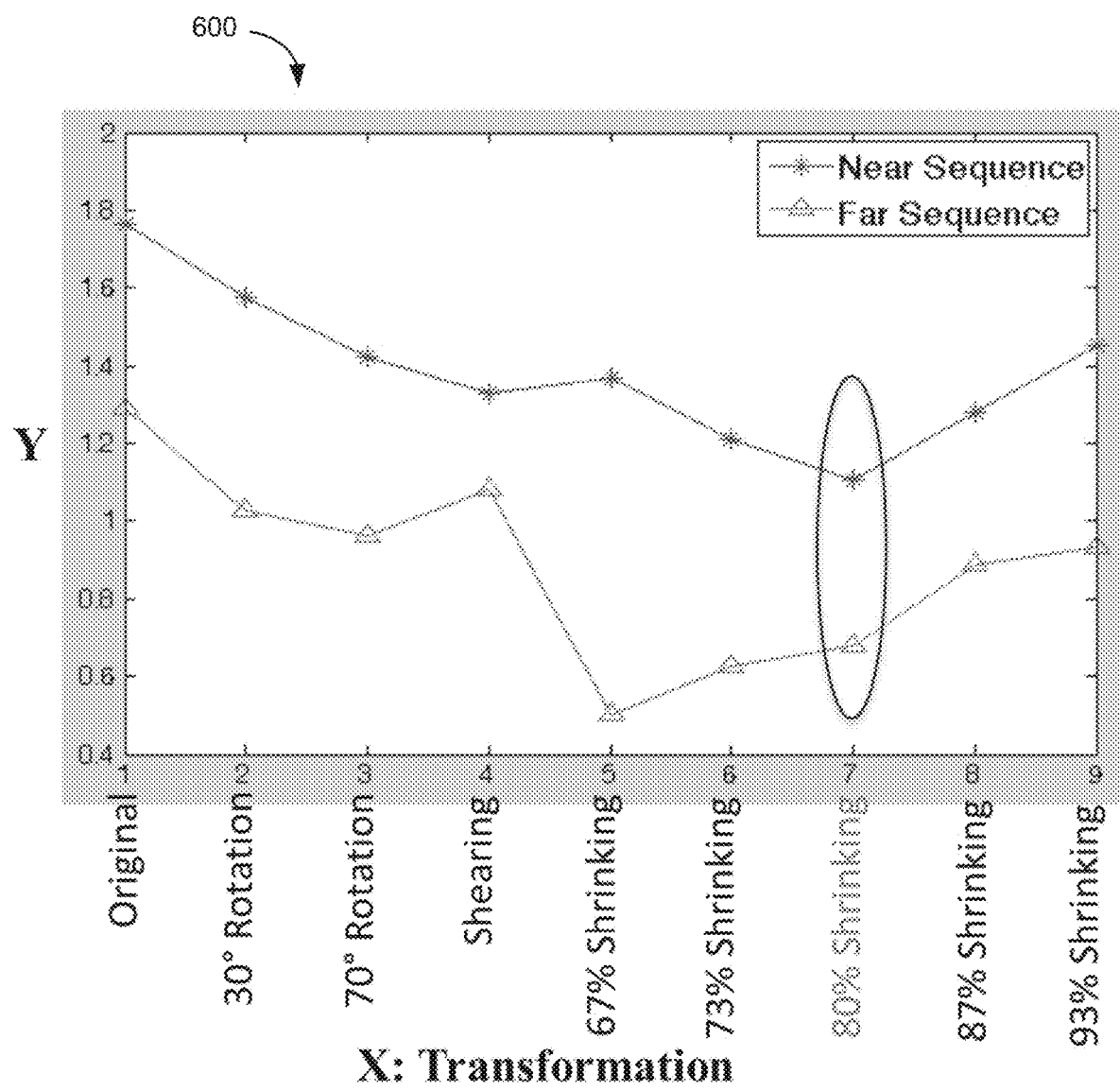
FIG. 6A illustrates a graphical representation of transformation optimization results for a texture-rich training image in accordance with an embodiment.

FIG. 6A illustrates a graphical representation of transformation optimization results for a texture-rich training image in accordance with an embodiment. In FIG. 6A, graphical representation 600 presents the results of a test in which the optimization metric, Y, is determined for various transformations applied to the texture-rich training image of FIG. 2A. For the test, the texture-rich training image had 1149 training features. The query images included 161 far-sequence images, and 113 near-sequence images. Although the data shows that the most desirable transformation out of the various transformations based on the optimization metric, Y, includes down-scaling the training image to 67% for far-sequence recognition, the more preferable setting for a combination of near-sequence images and far-sequence images is a scaling factor of 0.8 (i.e., 80%). The reasoning is that in the field it is expected that consumers will more likely capture close-up query images (e.g., of products for a shopping search) rather than images from further away. However, for some applications, far-sequence query images might be expected and, in such instances, a scaling factor more favorable to predominantly far-sequence images (e.g., a scaling factor of 0.67) might be selected.

Figure 6B:
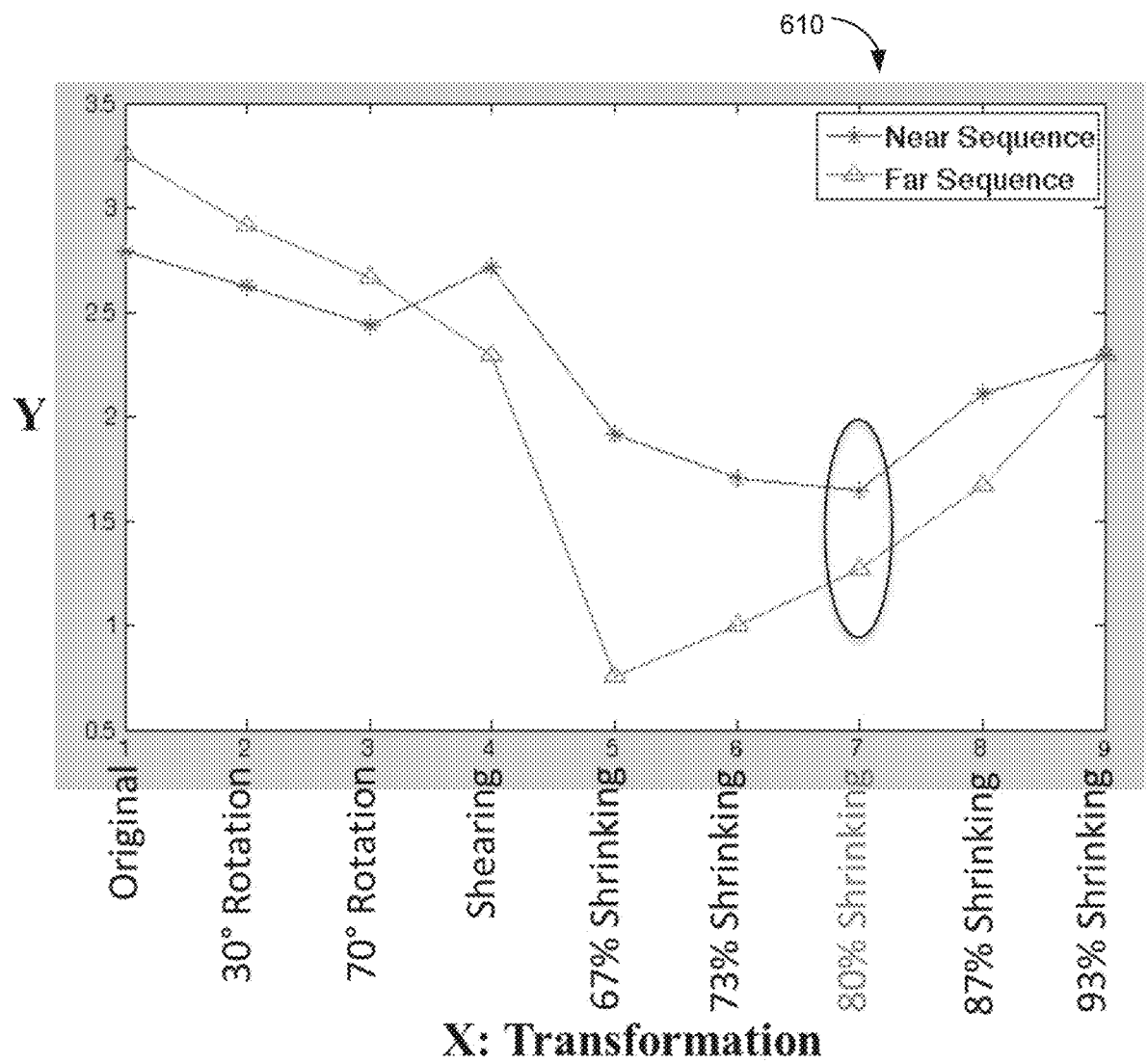
FIG. 6B illustrates a graphical representation of transformation optimization results for a medium texture training image in accordance with an embodiment.

FIG. 6B illustrates a graphical representation of transformation optimization results for a medium texture training image in accordance with an embodiment. In FIG. 6B, graphical representation 610 presents the results of a test in which the optimization metric, Y, is determined for various transformations applied to the medium texture training image of FIG. 2B. In this case, the medium texture training image included 707 training features. The query images included 299 far-sequence images, and 307 near-sequence images. As shown, the most optimal transformation for the combination of near-sequence images and far-sequence images tested is an 80% scaling of the training image, as in the texture-rich case.

Figure 6C:
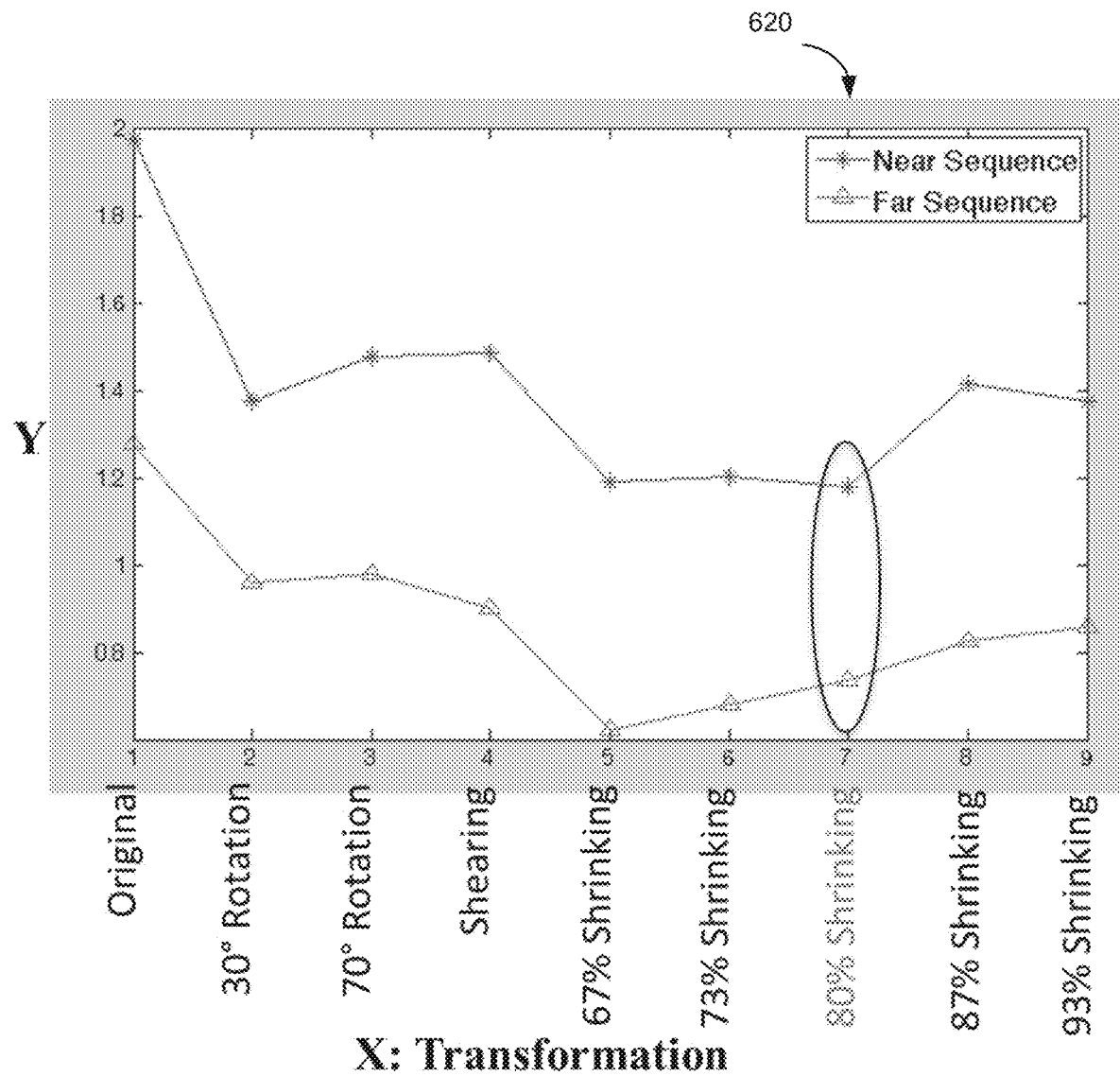
FIG. 6C illustrates a graphical representation of transformation optimization results for a texture-poor training image in accordance with an embodiment.

FIG. 6C illustrates a graphical representation of transformation optimization results for a texture-poor training image in accordance with an embodiment. In FIG. 6C, graphical representation 620 shows test results for the optimization metric, Y, for the same set of transformations applied to the texture-poor training image of FIG. 6C. The texture-poor image included 186 training features. For the test, the query images included 221 far-sequence images and 166 near-sequence images. Similar to the previous two cases, the most optimal transformation for a combination of near-sequence images and far-sequence images was an 80% scaling of the training image.

As such, the example tests indicate that a 0.8 scaling factor is practical for recognizing images across a broad spectrum of object types (e.g., texture-rich images, medium texture images and texture-poor images), while significantly reducing the size of the corresponding recognition database.

Therefore, the embodiments herein may be useful to address various memory footprint and precision challenges associated with large-scale image recognition systems (e.g., systems that may be scaled to include a 40 million or more document image dataset while achieving accelerated image recognition search times of 5 to 10 frames per second) possibly implemented on one or more web-based servers. It should be appreciated that a 50% reduction in database size without a loss in performance also provides for doubling the number of recognizable objects in the database, if desired or required by a target market or use-case.

In some embodiments, the identification of robust feature sets may be automated. For example, feature detector 310 and/or image capture device 320 may operate as a web bot that crawls web sites for images to ingest, e.g., images of people, social media profiles, etc. Further, the bot may operate on cityscape, streetscape or building interior images (e.g., Google® Street View images) to ingest features associated with buildings or places. In some embodiments, feature detector 310 and/or image capture device 320 may be configured to generate robust feature sets in real-time as images or videos are captured by a web bot, or another type of automated system.

In various embodiments, feature detector 310 and/or image capture device 320 may select between a plurality of predefined image transformations based on, for example, a targeted criteria such as a market-based criteria. For example, toys targeting children may include pastel-colored plastics having few observable features. In such case, a predefined image transformation may be selected to include an edge-enhancing transform (e.g., a transform that enhances descriptors for edge properties of an object, such as when few other non-edge features are discernable such that a resulting robust feature set may include features that exist on or near edges or other contours. As such, a predefined image transformation may be selected to accentuate desirable object recognition properties. Moreover, in some embodiments the selected predefined image transformation might not align with the feature detection algorithm. For example, the predefined image transformation may be selected for determining edge features (and edge feature descriptors) while the feature detection algorithm applied to the transformed image may be configured to generate other types of feature descriptors (e.g., SIFT descriptors).

The various embodiments may be further enhanced by determining a degree of robustness with respect to the predefined image transformation. For example, a robustness measure may be based on a distance, or on other values beyond distance. In some embodiments, the robustness measure may include a plurality of values indicating, e.g., a relative distance, a confidence score, a similarity measure, etc. Further, each detected feature may include a tag indicating its robustness measure and/or score with respect, for example, one or more predefined image transformations. For example, a robust feature may include one or more robustness measures for scaling, skewing, rotating, or other transformations. In some embodiments, a robustness measure may reflect subject-matter characteristics of training images (e.g., toys, medical, security, etc.) to indicate robustness with respect to different image transformations. For example, a robustness measure may reflect how images of toys (e.g., typically low texture, but with lots of edges) may behave differently with respect to different image transformations. The robustness measures may then be utilized during image recognition searches. For example, robust features may be used for an image recognition search and the robustness measure metadata may be used to classify the circumstances of the image recognition search (e.g., to generate image recognition search metadata that may be associated with a robust feature). Therefore, robustness measure metadata for a scaling transform, for example, may be used to determine a possible distance from a camera to a target object.

The various embodiments may be utilized for print media, such as print media that includes static images. In some embodiments, feature detector 310 and/or image capture device 320 may be integrated into a graphics application used for creating print media. For example, a graphic artist may create a printed media advertisement utilizing a graphics application (e.g., Adobe® Illustrator®) instrumented to operate according to one or more of the various embodiments. Thus, as the graphic artist develops a graphical representation (e.g., a printed media advertisement), the graphics application may provide an interface for presenting the location of the robust feature set for the rendering and/or a distribution of the robust features associated with the rendering. As such, the artist may be able to customize aspects of the robust feature set for the rendering, e.g., prior to an ad campaign, or during an ad campaign in real-time. Likewise, a videogame designer, logo designer or other creative professional may utilize a graphics application that includes feature detector 310 and/or image capture device 320 to develop a graphical representation (e.g., a graphical rendering within a game, or a logo), and the graphics application may provide an interface for presenting the location of the robust feature set for the representation and/or a distribution of the robust features associated with the representation.

The various embodiments may also be utilized for full 3D objects. For example, 3D objects (e.g., an action figure, a vehicle, etc.) may comprise different features when viewed from different perspectives. A video of a 3D object may be captured from different perspectives. The frames of the video can then be treated as training images and run through the disclosed process. Moreover, the entire infrastructure of large-scale image recognition systems, including the main memory and persistent storage devices, servers and user devices, can be made more efficient for processing image recognition queries due to the various embodiments.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

Figure 7:
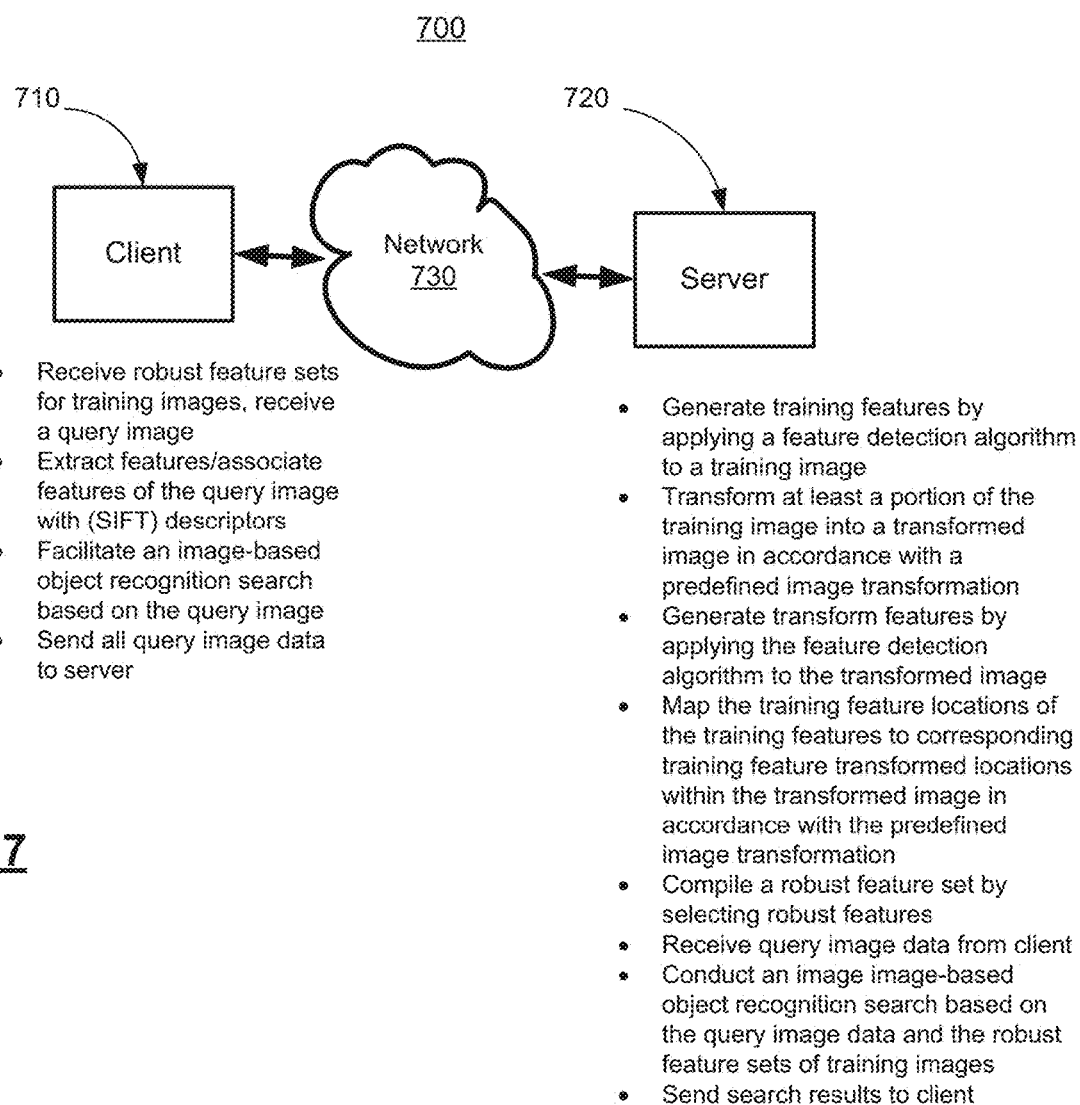
FIG. 7 illustrates a block diagram of an exemplary client-server relationship that can be used for implementing one or more aspects of the various embodiments.

A high-level block diagram of an exemplary client-server relationship that may be used to implement systems, apparatus and methods described herein is illustrated in FIG. 7. Client-server relationship 700 comprises client 710 in communication with server 720 via network 730, and illustrates one possible division of robust feature identification tasks between client 710 and server 720. For example, client 710, in accordance with the various embodiments described above, may be configured to communicate with server 720 to receive robust feature sets for training images, receive a query image, extract features/associate features of the query image with (SIFT) descriptors, and facilitate an image-based object recognition search based on the query image and/or send all query image data to server 720. Server 720 may be configured to generate training features by applying a feature detection algorithm to a training image, transform at least a portion of the training image into a transformed image in accordance with a predefined image transformation, generate transform features by applying the feature detection algorithm to the transformed image, map the training feature locations of the training features to corresponding training feature transformed locations within the transformed image in accordance with the predefined image transformation, and compile a robust feature set by selecting robust features. In some embodiments, server 720 may be further configured to receive query image data from client 710, conduct an image image-based object recognition search based on the query image data and the robust feature sets of training images, and send search results to client 710. One skilled in the art will appreciate that the exemplary client-server relationship illustrated in FIG. 7 is only one of many client-server relationships that are possible for implementing the systems, apparatus, and methods described herein. As such, the client-server relationship illustrated in FIG. 7 should not, in any way, be construed as limiting. Examples of client devices 710 can include cell phones, kiosks, personal data assistants, tablets, toys, vehicles, web cameras, or other types of computer devices.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
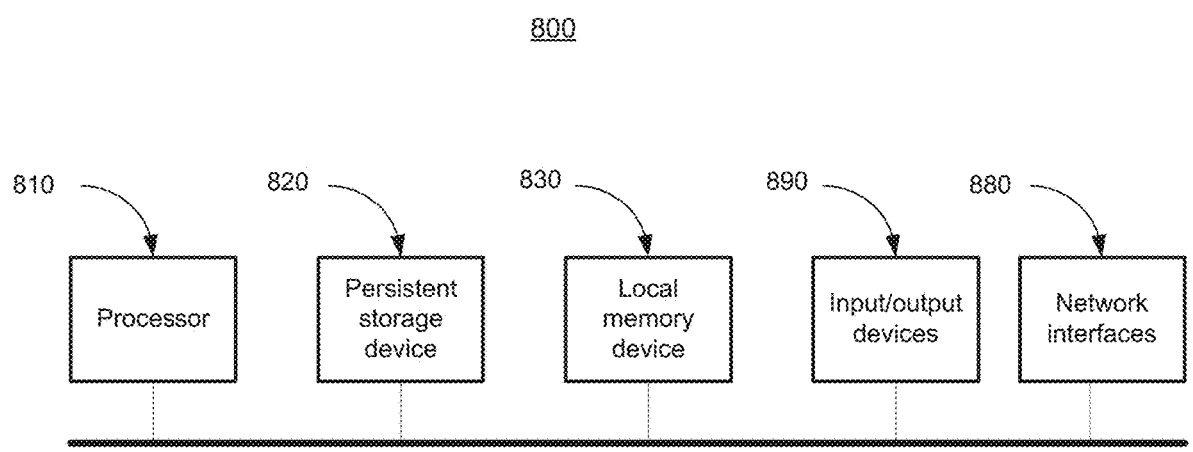
FIG. 8 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 8. Apparatus 800 comprises a processor 810 operatively coupled to a persistent storage device 820 and a main memory device 830. Processor 810 controls the overall operation of apparatus 800 by executing computer program instructions that define such operations. The computer program instructions may be stored in persistent storage device 820, or other computer-readable medium, and loaded into main memory device 830 when execution of the computer program instructions is desired. For example, feature detector 310 and image capture device 320 may comprise one or more components of computer 800. Thus, the method steps of FIG. 4 can be defined by the computer program instructions stored in main memory device 830 and/or persistent storage device 820 and controlled by processor 810 executing the computer program instructions. For example, the computer program instructions can be implemented as computer executable code programmed by one skilled in the art to perform an algorithm defined by the method steps of FIG. 4. Accordingly, by executing the computer program instructions, the processor 810 executes an algorithm defined by the method steps of FIG. 4. Apparatus 800 also includes one or more network interfaces 880 for communicating with other devices via a network. Apparatus 800 may also include one or more input/output devices 890 that enable user interaction with apparatus 800 (e.g., display, keyboard, mouse, speakers, buttons, etc.).

Processor 810 may include both general and special purpose microprocessors, and may be the sole processor or one of multiple processors of apparatus 800. Processor 810 may comprise one or more central processing units (CPUs), for example. Processor 810, persistent storage device 820, and/or main memory device 830 may include, be supplemented by, or incorporated in, one or more application-specific integrated circuits (ASICs) and/or one or more field programmable gate arrays (FPGAs).

Persistent storage device 820 and main memory device 830 each comprise a tangible non-transitory computer readable storage medium. Persistent storage device 820, and main memory device 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 890 may include peripherals, such as a printer, scanner, display screen, etc. For example, input/output devices 890 may include a display device such as a cathode ray tube (CRT), plasma or liquid crystal display (LCD) monitor for displaying information (e.g., a plurality of image transformations for selection) to a user, a keyboard, and a pointing device such as a mouse or a trackball by which the user can provide input to apparatus 800.

Any or all of the systems and apparatus discussed herein, including feature detector 310 and image capture device 320 may be performed by, and/or incorporated in, an apparatus such as apparatus 800.

One skilled in the art will recognize that an implementation of an actual computer or computer system may have other structures and may contain other components as well, and that FIG. 8 is a high level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A product image feature detection device comprising:
    a tangible, non-transitory, computer-readable memory configured to store robust feature detection software instructions including at least one implementation of a feature detection algorithm, and at least one product training image; and
    at least one processor coupled with the memory that, upon execution of the robust feature detection software instructions:
        generates training features from the at least one product training image according to the at least one implementation of the feature detection algorithm, wherein each training feature has a corresponding training feature location within the at least one product training image;
        transforms at least a portion of the at least one product training image according to an image transformation, thereby forming a transformed image portion;
        generates transform features from the transformed image portion according to the at least one implementation of the feature detection algorithm, wherein each transform feature has a corresponding transform feature location within the transformed image portion; and
        stores in the memory a set of robust features, wherein each robust feature in the set represents a training feature, based on the image transform, having a training feature transformed location proximal to a transform feature location.

2. The device of claim 1, wherein the image transformation is user-selectable.

3. The device of claim 1, wherein the image transformation comprises an image perturbation.

4. The device of claim 1, wherein the image transformation comprises an image processing transform.

5. The device of claim 4, wherein the image processing transform includes at least one the following: a Gaussian filter, a color transform, an edge enhancing transform, and a lossy compression.

6. The device of claim 1, wherein the image transformation comprises a geometric transform.

7. The device of claim 6, wherein the geometric transform comprises at least one of the following: a skewing, a rotation, and a shearing.

8. The device of claim 1, wherein the image transformation includes a scale transform.

9. The device of claim 8, wherein the scale transform comprises an up-scaling.

10. The device of claim 8, wherein the scale transform comprises a down-scaling.

11. The device of claim 8, wherein the scale transform comprises a linear scaling.

12. The device of claim 8, wherein the scale transform comprises a scaling factor of at least two.

13. The device of claim 8, wherein the scale transform comprises a scaling factor based on subject matter of the at least one product training image.

14. The device of claim 1, wherein the at least one product training image comprises a near-sequence image.

15. The device of claim 1, wherein the at least the portion of the at least one product training image comprises a patch.

16. The device of claim 1, wherein the at least one product training image includes a consumer product.

17. The device of claim 1, wherein the at least one product training image includes a vehicle.

18. The device of claim 1, wherein the at least one product training image includes clothing.

19. The device of claim 1, wherein the at least one product training image includes a game.

20. The device of claim 1, wherein the at least one product training image includes a package.

21. The device of claim 1, wherein the at least one product training image includes a device.

22. The device of claim 1, wherein the at least one product training image comprises at least one video frame.

23. The device of claim 1, wherein each robust feature comprises a robustness measure with respect to the image transformation.

24. The device of claim 23, wherein the robustness measure reflects subject matter characteristics of the at least one product training image.

25. The device of claim 1, wherein the at least one product training image is a member of a test library of product images.

26. The device of claim 1, wherein the at least one implementation of the feature detection algorithm includes an implementation of one of the following: a scale-invariant feature transform (SIFT), Fast Retina Keypoint (FREAK), Histograms of Oriented Gradient (HOG), Speeded Up Robust Features (SURF), DAISY, Binary Robust Invariant Scalable Keypoints (BRISK), FAST, Binary Robust Independent Elementary Features (BRIEF), Harris Corners, Edges, Gradient Location and Orientation Histogram (GLOH), Energy of image Gradient (EOG), an edge detection algorithm, and Transform Invariant Low-rank Textures (TILT) feature detection algorithm.

27. The device of claim 1, wherein the device is a mobile device.

28. A product image feature detection method comprising:
generating training features from at least one product training image according to at least one implementation of a feature detection algorithm, wherein each training feature has a corresponding training feature location within the at least one product training image;
transforming at least a portion of the at least one product training image according to an image transformation, thereby forming a transformed image portion;
generating transform features from the transformed image portion according to the at least one implementation of the feature detection algorithm, wherein each transform feature has a corresponding transform feature location within the transformed image portion; and
storing in memory a set of robust features, wherein each robust feature in the set represents a training feature, based on the image transform, having a training feature transformed location proximal to a transform feature location.

29. A computer program product embedded in a non-transitory computer readable medium comprising product image feature detection instructions executable by a computer processor to perform operations comprising:
generating training features from at least one product training image according to at least one implementation of a feature detection algorithm, wherein each training feature has a corresponding training feature location within the at least one product training image;
transforming at least a portion of the at least one product training image according to an image transformation, thereby forming a transformed image portion;
generating transform features from the transformed image portion according to the at least one implementation of the feature detection algorithm, wherein each transform feature has a corresponding transform feature location within the transformed image portion; and
storing in memory a set of robust features, wherein each robust feature in the set represents a training feature, based on the image transform, having a training feature transformed location proximal to a transform feature location.

* * * * *